United States Patent

Ehrat

[15] 3,658,224

[45] Apr. 25, 1972

[54] TAPE FEEDING MECHANISM

[72] Inventor: Kurt Ehrat, Zurich, Switzerland

[73] Assignee: Ciba-Geigy AG, Basel, Switzerland

[22] Filed: Dec. 9, 1969

[21] Appl. No.: 883,473

[30] Foreign Application Priority Data

Dec. 13, 1968 Switzerland ........................18665/68

[52] U.S. Cl. ..................................................226/58, 226/68

[51] Int. Cl. ....................................................B65h 17/40

[58] Field of Search ......................226/55, 56, 57, 58, 62, 67, 226/68

[56] References Cited

UNITED STATES PATENTS 2,772,325 11/1956 Gaite ..................................226/57 X 3,434,640 3/1969 Coutant..................................226/57

*Primary Examiner*—Richard A. Schacher

*Attorney*—Pierce, Scheffler & Parker

[57] ABSTRACT

Mechanism for intermittently feeding a tape wherein perforations in the tape are engageable by a tape feeding shuttle arm having a plurality of teeth adapted to reciprocate parallel to the plane of the tape as well as perpendicularly thereto and by a tape stop arm having a plurality of teeth adapted to reciprocate at least perpendicularly to the plane of the tape. The shuttle arm and the stop arm are coupled to a mechanical oscillator by a first coupling device providing reciprocating motion parallel, and by second coupling device providing reciprocating motion perpendicularly, to the plane of the tape; the second coupling device includes linkage means causing the teeth of the shuttle arm to engage the perforations in the tape while disengaging therefrom the teeth of the stop arm on a reciprocating stroke of the oscillator perpendicularly to the plane of the tape thereby allowing reciprocating movement of the shuttle arm parallel to the plane of the tape to feed the tape and subsequently on a return reciprocating stroke of the oscillator perpendicularly to the plane of the tape to disengage itself from the perforations the teeth of the shuttle arm and engage the teeth of the stop arm to prevent further feed movement of the teeth.

20 Claims, 12 Drawing Figures

Inventor

Kurt Ehrat

By Pierce, Scheffler & Parker

Attorneys

Figure 1:
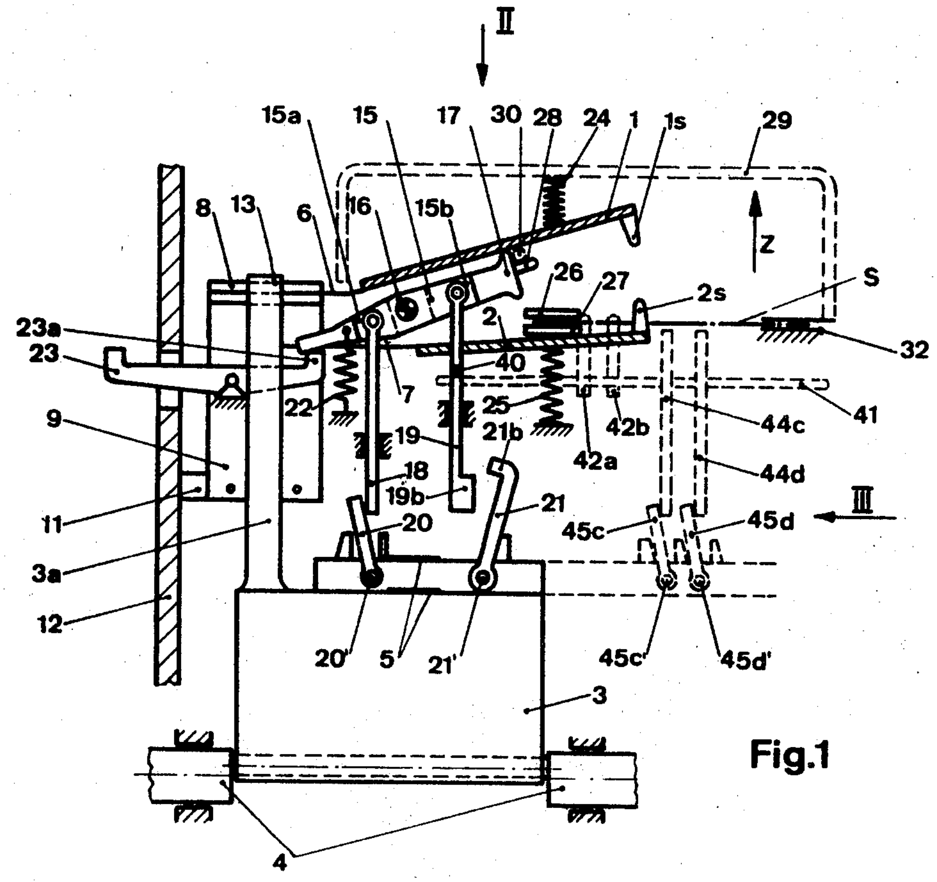

Inventor
Kurt Ehrat
By Pierce, Scheffler & Parker
Attorneys

Inventor
Kurt Ehrat
By Pierce, Scheffler & Parker
Attorneys

Inventor
Kurt Ehrat

By Pierce, Scheffler & Parker
Attorneys

Inventor

Kurt Ehrat

By Pierce, Scheffler & Parker

Attorneys

Inventor

Kurt Ehrat

By Pierce Scheffler & Parker

Attorneys

Inventor

Kurt Ehrat

By Pierce, Scheffler & Parker

Attorneys

TAPE FEEDING MECHANISM

This invention relates to mechanism for intermittently feeding a tape, particularly in tape-punching or punched-tape reading machines, wherein perforations in the tape are engageable by a tape feeding shuttle arm adapted to reciprocate parallel to the plane of the tape as well as perpendicularly thereto and by a tape stop arm adapted to reciprocate at least pependicularly to the plane of the tape, the tape control arms alternately engaging the tape perforations and the stop arm immobilizing the tape from the time of disengagement to the time of re-engagement of the tape peforations by the tape feeding shuttle arm.

In conventional mechanisms of the above-described kind which are driven by electromagnetic means, the relative movements of the two tape control arms are provided by a complicated system of springs and levers. This mechanism has a fairly high mass and is therefore unsuitable for high feeding speeds because of its inertia, friction and noise, as well as on account of its high cost of maintenance. Moreover, owing to the employment of electromagnets as drive means for the tape control arms, the starting and stopping motions are abrupt and jerky. The considerable forces needed when starting and stopping each feeding step for overcoming the considerable inertial mass of the control arms and their associated control system directly affect the armatures of the magnets when these operate and release. The curve representing the motions of the tape feeding shuttle arm is approximately rectangular and thus provides unfavorable accelerational and kinematic conditions because the masses must be abruptly accelerated and braked four times in the course of each working cycle of the tape feeding shuttle arm.

In the present invention these objections are overcome by deriving all the movements of said tape control arms from a single oscillator through coupling means, said oscillator being itself linked to a motor-driven eccentric and tiltable about an axis which is movable perpendicularly to said plane of said tape, the movements of said oscillator being thus composed of a substantially harmonic reciprocation perpendicular to said plane of said tape and a synchronous substantially harmonic reciprocation parallel thereto, both said tape control arms being entrainable by said coupling means to participate in said component of motion perpendicular to said plane of said tape, whereas said tape feeding shuttle arm also participates in said component of motion which is parallel to said plane of said tape.

In the mechanism according to the present invention the coupling means between the tape control arms and the oscillator are not permanent but can be selectably engaged and disengaged. In tape feeding mechanism hitherto known in the art in which the tape control arms are cam-controlled, the coupling between the control arms and the motor driven camshaft is permanent. For starting and stopping, the camshaft or the motor must therefore be started and stopped, and this is also necessary if the direction of feed is to be reversed. The accelerating and braking phases reduce the effective speed of the feed and also involve power loss due to the additional inertia. In the proposed mechanism the drive means may be kept in continuous operation. The tape control arms which can be of light-weight construction are simply coupled to the drive means for starting and disengaged for stopping the feed. Starting and stopping therefore involves substantially no delay and expends no extra power in overcoming inertia.

In a preferred embodiment of the invention the coupling means between the two tape control arms and the oscillator are so contrived that the phase of the component of motion which controls the feed motion of the shuttle arm can be selectably shifted by half a cycle. This permits the direction of feed to be reversed in a manner substantially free from inertial effects.

Figure 2:
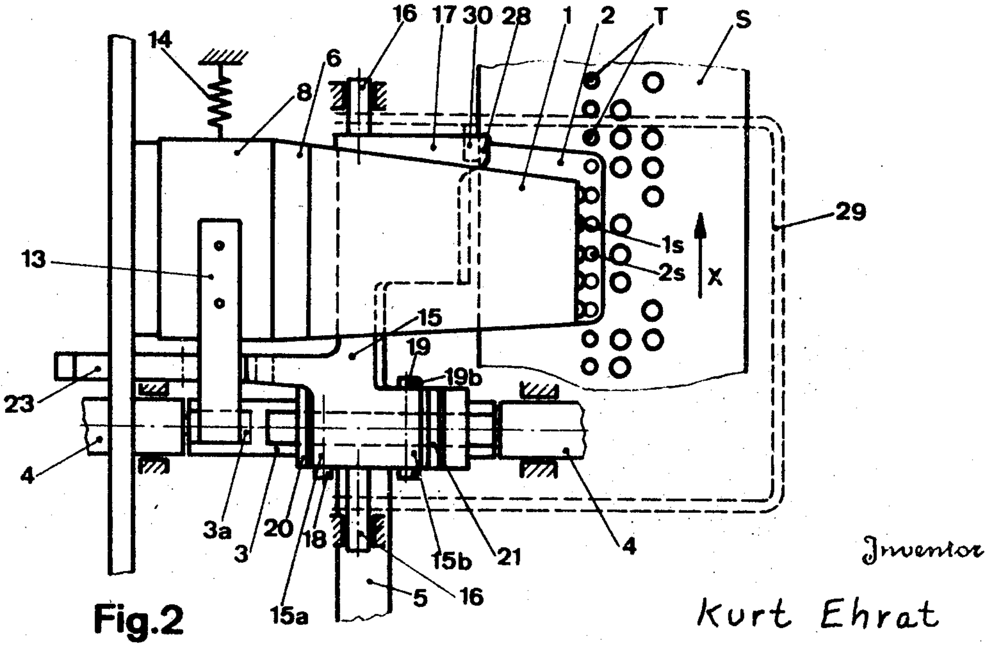
Figure 3:
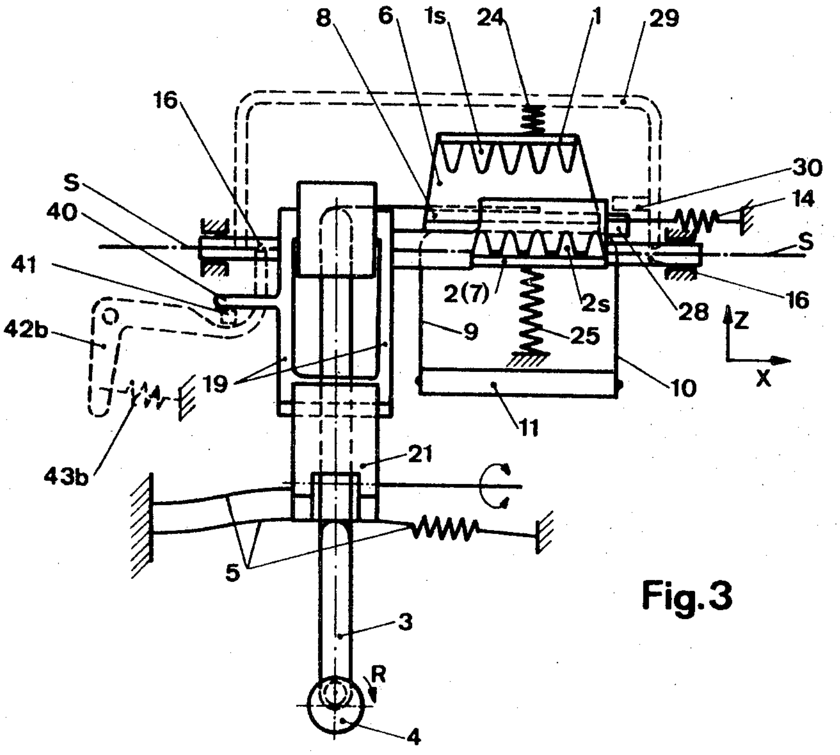
Figure 4:
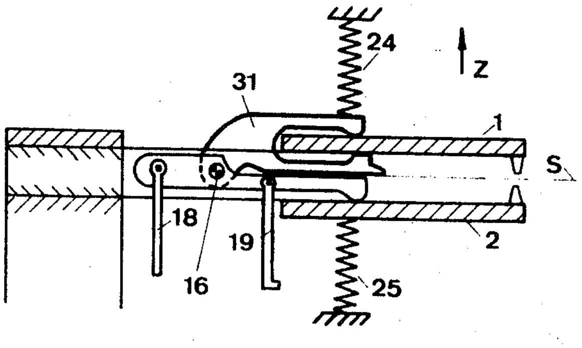
Figure 5:
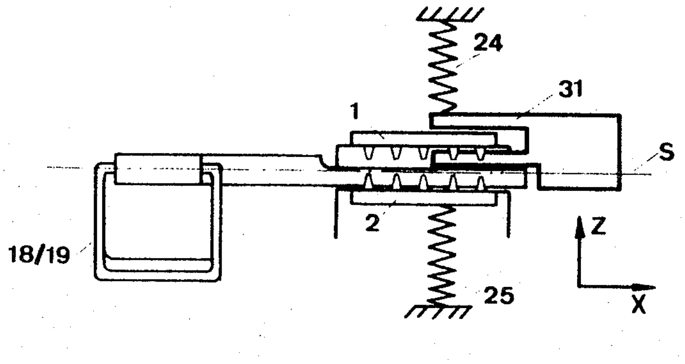

The invention will be hereinafter more particularly and illustratively described and reference made to the drawings in which FIGS. 1 to 3 are three views of an embodiment of the invention, FIG. 2 being a view in the direction of the arrow II and FIG. 3 a view in the direction of the arrow III in FIG. 1, FIGS. 4 and 5 are two views of a modification of a detail in the embodiment according to FIGS. 1 to 3, FIGS. 6 to 8 are part of the mechanism in FIG. 1 in three different phases of a working cycle, and FIGS. 9 to 12 are explanatory diagrams illustrating the manner in which the mechanism functions.

In FIGS. 1 to 3 a tape feeding shuttle arm 1 and a tape stop arm 2 are operated by a common oscillator 3 for intermittently feeding a punched tape S. The bottom of the oscillator 3 is eccentrically mounted on a drive shaft 4. The middle of the oscillator is suspended between tensioned straps 5 which permit vertical reciprocation of the oscillator which has an upwardly extending arm 3*a*. Consequently the arm 3*a* will also reciprocate in the direction marked $x$ and at the same time every point on the oscillator at the level of the two straps 5 will reciprocate in the direction marked $z$, perpendicularly to the direction $x$. The lateral as well as the vertical reciprocations are at least approximately harmonic motions (sine motions). This necessarily follows from the fact that the oscillator is eccentrically mounted on the drive shaft and vertically guided by the straps. The strap suspension could be replaced by some alternative guide means, such as a slipper and slot. However, it has been found that a strap suspension ensures very smooth running and requires no maintenance. The two tape control arms 1 and 2 face each other like gripper arms and each is independently deflectably mounted, the arrangement being such that teeth 1*s* on the shuttle arm can engage perforations T in the tape S from above, whereas teeth 2*s* on the stop arm can engage these perforations from below. The hinges of the arms 1 and 2 are constituted by laterally stiff leaf springs 6 and 7 respectively. The clamping means 8 for the leaf spring 6 holding the shuttle arm 1 is mounted between two leaf springs 9 and 10 which are attached at their bases to a plate 11 secured to a fixed part 12 of the frame. The clamping means 8 is coupled by a strap 13 to the reciprocating end of the arm 3*a* of the oscillator 3 which thus pulls the shuttle arm to and fro in the direction $+x$ and $-x$ against a counterspring 14. The reciprocations thus imparted to the shuttle arm 1 are therefore substantially in a plane parallel to the plane of the tape (S) and provide the tape feeding and return motions of the shuttle arm in the $x$ direction. The leaf spring 7 which forms the hinge of the stop arm 2 is clamped in a fixed mount. In the direction in which the arms 1 and 2 are deflectable on their springs ("$+z$," "$-z$") they can be coupled to the vertical component of reciprocation of the oscillator 3 and for reversing the direction of feed ("$+x$" or "$-x$") the coupling can be selectably changed to shift the reciprocation by a half cycle. In the illustrated embodiment vertical coupling is provided by a two-armed rocking lever 15 which pivots on a shaft 16, and which has an extension 17 between the two tape control arms 1 and 2. The arms 15*a* and 15*b* of this lever can be coupled by vertically slidable links 18 and 19 and coupling members 20 and 21 respectively to the vertically reciprocating motion of the oscillator 3. The rocking lever 15 is urged by a spring 22 into a position of rest in contact with an abutment 23*a*. In this position of rest the shuttle arm 1 is disengaged from the perforations T in the tape S, whereas the stop arm 2 engages the same. As shown in the drawing the abutment 23*a* is formed on a lever 23. Coupling members 20 and 21 are of flat prismatic form which can be selectably deflected about their hinges at 20' and 21'. In the illustrated position the two coupling members are disengaged. By deflecting the coupling member 20 into the vertical position it can be coupled to the link 18 to apply upward thrust to the link, whereas the coupling member 21 has a hook-shaped end 21*b* for co-operation with a hook 19*b* on the end of the link 19 and is therefore adapted to pull the latter link downwards. According to whether coupling member 20 or 21 is in operative position the shuttle arm 1 will feed in the one or in the other direction ("$+x$" or "$-x$"). This action will be referred to in greater detail again. The springs 6 and 7 of the tape control arms may be so shaped or their ends may be so clamped that they urge the arms towards the punched tape S, i.e. towards the track 32 of the tape. However, in the illustrated embodiment special compression springs 24 and 25 are arranged to provide additional bias. The tape engaging vertical deflections of the arms 1 and 2 are each limited by a stop 26 and 27 respectively. The arms are covered by a hood 29 (indicated in discontinuous lines). This hood hinges on the shaft 16 and has a pin 30 which is arranged to rest on an abutment 28 of the rocker lever 15. When the lever 23 is deflected to lower the abutment face 23*a* the spring 22 pulls the co-operating end of the rocker lever 15 further down thus moving the abutment 28 of the rocker lever 15 upwards engaging the pin 30 to open the hood 29.

In FIGS. 1 to 3 one end of the spring 24 directly co-operates with the shuttle arm 1. However, it is desirable that the connection should permit relative slidable motion in *x* direction. A preferred form of construction of this detail arrangement is shown in FIGS. 4 and 5, in which the spring 24 bears on a fork 31 which is hinged on the shaft 16. The two arms of the fork embrace the shuttle arm from both sides but permit the shuttle arm to slide in *x* direction.

FIGS. 1 to 3 show the mechanism during that part of the cycle in which the shuttle arm performs its return motion.

Figure 6:
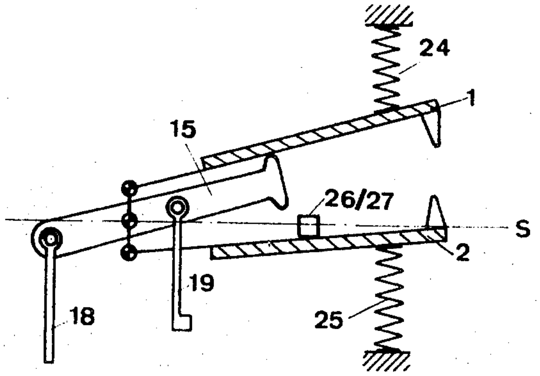
Figure 7:
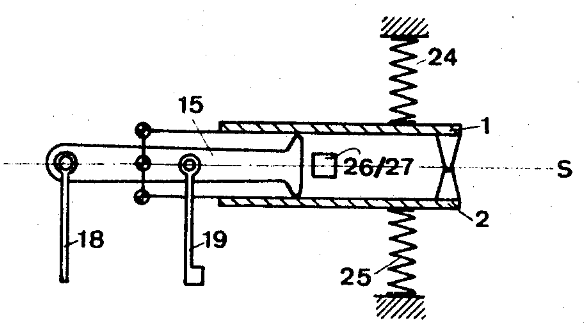
Figure 8:
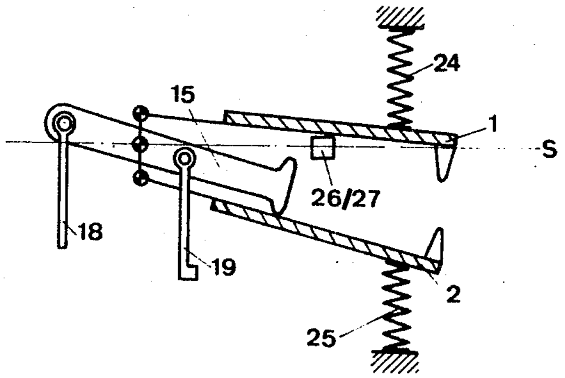

FIGS. 6 to 8 schematically illustrate the three principal positions of the control arms 1 and 2. In FIG. 6, which corresponds to the position in FIGS. 1 to 3, the shuttle arm 1 is disengaged from the tape perforations, whereas the arm 2 is in engagement therewith. FIG. 7 shows the instant at which the shuttle arm 1 moves into engagement with the tape perforations and the stop arm 2 is about to disengage. FIG. 8 is the instant at which the shuttle arm 1 is in full engagement and the stop arm 2 is disengaged.

The manner in which the mechanism according to FIGS. 1 to 3 functions will now be described in detail with reference to the diagrams in FIGS. 9 to 12.

Figure 9:
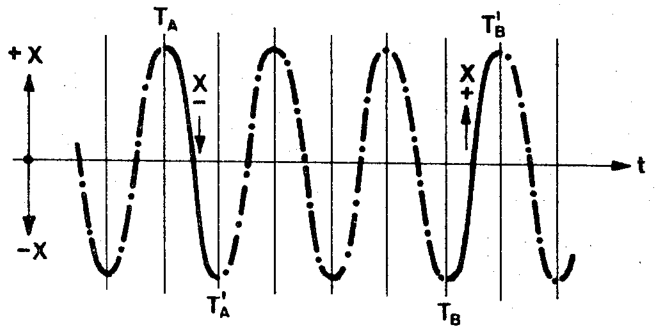

FIG. 9 represents the reciprocatory motions of the arm 3*a* of the oscillator 3 in the form of a plot over time *t*, and hence the reciprocations in the *x* direction (FIG. 2) of the shuttle arm 1 which is coupled to the arm 3*a* by the strap 13. This reciprocation is at least approximately harmonic (sinusoidal). The teeth 1*s* of the shuttle arm engage the perforations T in the tape S either at its "+*x*" points or at its "−*x*" points of motion reversal, according to whether the coupling member 20 is coupled to the link 18 for thrust (pushing the link upwards) or whether the coupling member 21 is coupled to the link 19 for pull (pulling the link downwards) to actuate the rocker 15 (FIG. 1). In the former case the shuttle arm 1 will feed the tape S in "−*x*" direction, whereas in the latter case it will feed in "+*x*" direction when the eccentric revolves in the direction R indicated in FIG. 3 (clockwise). The following explanations are based upon the assumption that the rotation of the eccentric is clockwise. The periods of engagement i.e. the feeding periods of the shuttle arm are indicated in FIG. 9 by full lines. The direction of feed is indicated by arrows. Instants of tape engagement and disengagement are marked $T_A$, $T_B$ and $T_A'$, $T_B'$ respectively.

Figure 10:
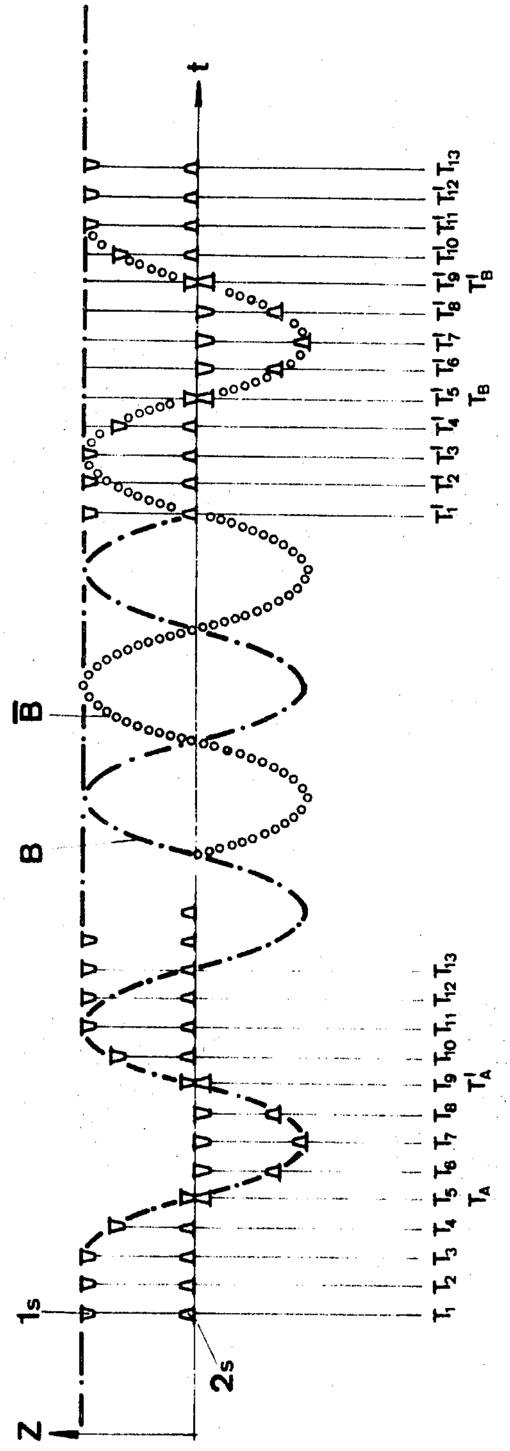

In FIG. 10 the motions of the two arms 1 and 2 and of the rocker extension 17 and their relative phase positions are shown in the form of plots over the time *t*. The movements of the shuttle and stop arms are symbolized by showing the positions of their teeth 1*s* and 2*s* and those of the rocker extension 17 by the curves B and $\overline{B}$. The curves B and $\overline{B}$ are relatively shifted in phase by a half cycle. Curve B applies when the coupling member 20 is operative and curve $\overline{B}$ when the coupling member 21 (FIG. 1) is operative.

Figure 11:
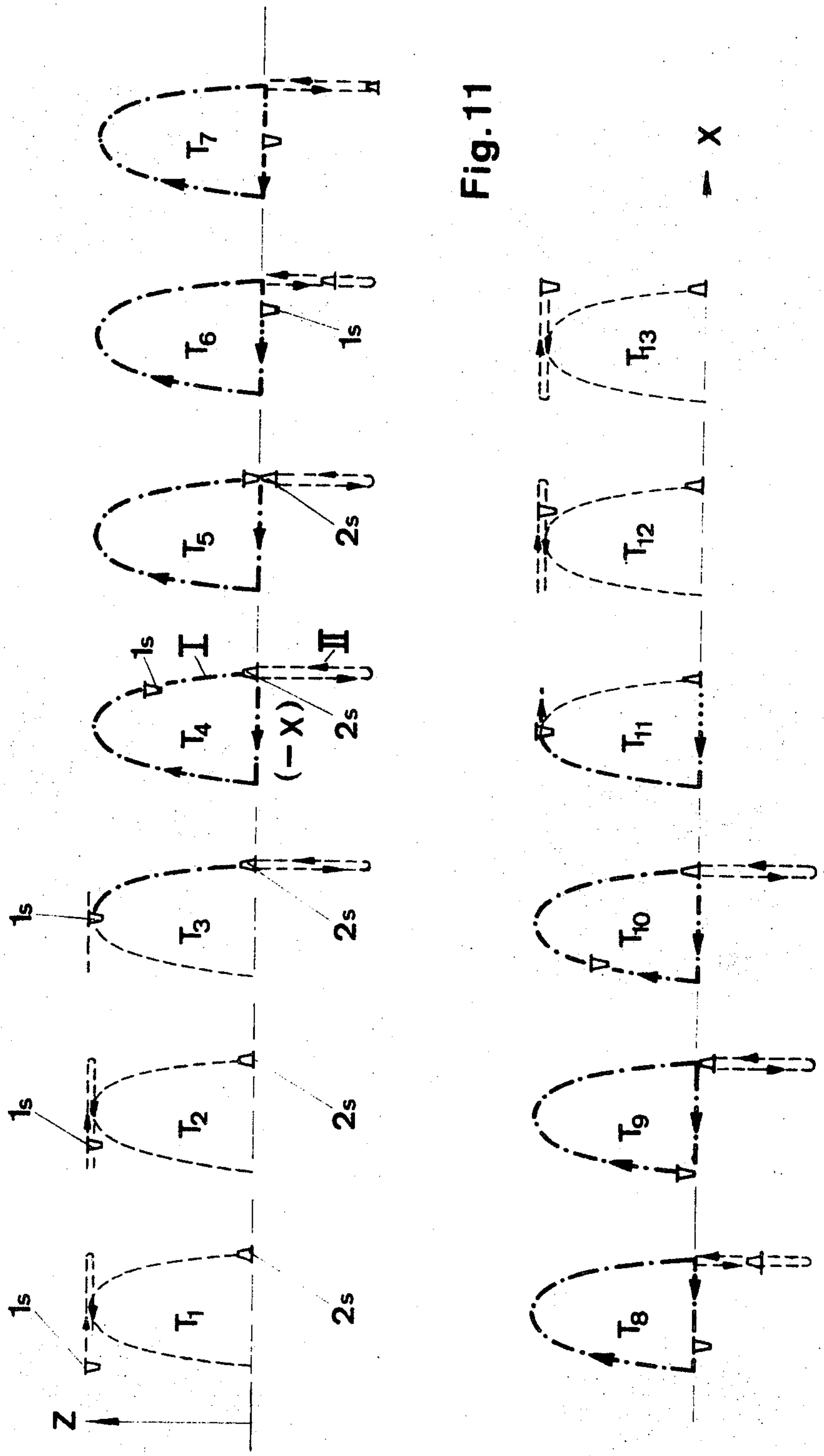
Figure 12:
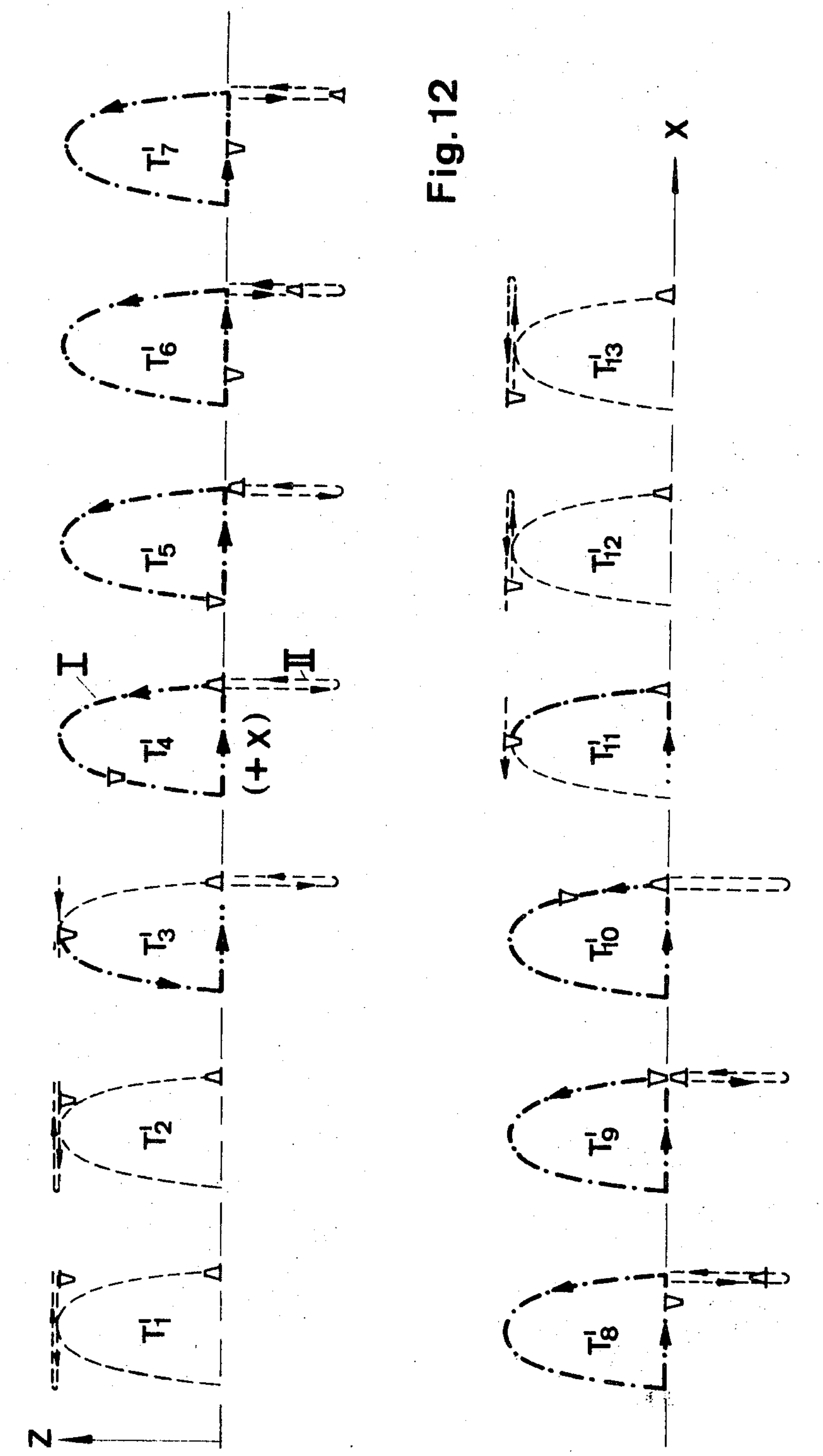

FIGS. 11 and 12 show phases in the motions of the arms 1 and 2 and their teeth 1*s* and 2*s* in the *x-z* plane, FIG. 11 referring to the "+*x*" and FIG. 12 to the "−*x*" direction of feed.

In FIGS. 10 to 12 it is assumed that up to the time $T_3$, between the time $T_{11}$ and $T_3'$ and after the time $T_{11}'$ the two coupling members 20 and 21 (FIG. 1) are inactivated. The transmission of the vertical component of motion of the oscillator 3 to the arms 1 and 2 (via 18–16–17 respectively 19–16–17) is interrupted, the stop arm 1 (teeth 2*s*) engaging the tape and immobilising the same, whereas the shuttle arm 1 (teeth 1*s*) which is permanently coupled to the reciprocating arm 3*a* of the oscillator 3 reciprocates parallel to the plane of the tape. It is further assumed that at the time $T_3$ the coupling member 20 (FIG. 1) is deflected into the operative vertical position. This couples the rocker lever 15 to the upward stroke of the vertical reciprocation of the oscillator 3. Consequently, the rocker extension 17 is deflected downwards and the shuttle arm 1 follows, urged by its springs 24 and/or 6. The superimposed component of reciprocation (in *x* direction) generates an at least approximately harmonic motion (part of a sine wave motion). At the time $T_5$ ($T_5 = T_A$, FIG. 9) the tips of the teeth 1*s* of the shuttle arm have reached the plane S of the tape, the stop arm having started its downward deflection fractionally before. The synchronization at this instant is such that the tips of the teeth 1*s* and 2*s* of the shuttle and stop arms both align in the plane of the tape or are in tip to tip contact as the shuttle arm teeth move into engagement. Since at the time $T_5$ ($= T_A$) the component of reciprocation (in *x* direction) reverses direction (cf. FIG. 9) the shuttle arm has ample time for its teeth 1*s* cleanly and fully to engage the perforations T before the motion in "− *x*" direction takes effect. During the time from $T_5$ to $T_9$ the shuttle arm performs a feeding shuttle motion in "−*x*" direction. At the time $T_9$ ($= T_A'$, FIG. 9) the teeth 1*s* and 2*s* of the two control arms again meet in the plane (S) of the tape. The stop arm teeth engage with and the shuttle arm teeth disengage from the perforations prior to starting their return shuttle motion. Assume that at the time $T_{11}$ the coupling member 20 (FIG. 1) is deflected back into inactive position and that the coupling member 21 remains in inoperative position (FIG. 1). The stop arm will then remain in engagement with the tape perforations and the shuttle arm will remain in disengaged position as indicated between the times $T_{11}$ and $T_{13}$ etc., until one of the coupling members 20 or 21 is returned into its operative position. Assume that at the time $T_3'$ the coupling member 21 (FIG. 1) is moved into a position such that its hooked shaped end 21*b* engages with the hook 19*b* of link 19. The rocker lever 15 will then be coupled to the oscillator 3 for downward deflection thereby. Consequently, the rocker extension 17 will again descend, but compared with the motions between the times $T_3$ and $T_{11}$ and the superimposed component of reciprocation (in *x* direction) its phase will now be shifted by 180°. Consequently, the tape will be fed one step in the "+*x*" direction, the motions from $T_5'$ to $T_9'$ being otherwise analogous. At $T_{11}'$ both coupling members 20 and 21 are again assumed to be inactivated (FIG. 1). Until one of the two coupling members 20 and 21 is returned to its operative position the stop arm will therefore again remain permanently in engagement with the perforations in the tape and the shuttle arm will remain permanently disengaged.

Any change in the position of the coupling members 20 and 21 must always take place in the region of the bottom dead center of the vertical reciprocation of the oscillator 3. For this purpose the actuation of the coupling members must be suitably synchronized by, for example, a mechanism as disclosed in my co-pending application Ser. No. 878,803.

Each of the two coupling members 20 and 21 may therefore be coupled by a torsionally flexible shaft at their hinge points 20′ and 21′ to the armature of an electromagnet. The armature is mechanically engageable by the oscillator 3 in such a way that during that half of each vertical reciprocation which follows bottom dead center, the armature is pushed into contact with the core of the electromagnet. Independently of the position of the armature the coupling member (20 respectively 21) after leaving its change-over zone is locked in each cycle at least until the next dead center is reached. The The energization of the magnet is so controlled and adjusted that the magnet is energized roughly from the time the armature moves into contact with the core to at least the time the coupling member or its contact-making end leaves the change-over zone. By utilizing the lifting power of the oscillator for moving the armature into contact with its core in combination with the storage of energy in the torsionally flexible shaft, control of the coupling members can be effected with an optimum degree of speed and precision and with the aid of a minimum of magnetic force, and more particularly without major demands being made upon the precision in time and phase position of the energization cycle. Naturally conventional control means could be provided for controlling a change-over of the coupling members 20 and 21.

The proposed mechanism can be readily equipped to operate as a machine for punching tape and/or for reading a punched tape, by coupling punches and/or sensing elements to the oscillator 3 for vertical reciprocation thereby. The more important elements of an embodiment of such a modification are indicated in dotted lines in FIGS. 1 and 3. A punch and a sensing lever are provided in register with each line of holes representing the information contained in the tape S. In order to avoid overcomplicating the drawing only two punches 44*c* and 44*d* and two sensing levers 42*a* and 42*b* are indicated. Each punch is selectively operable by an entraining element 45*c* 45*d* and each sensing lever is urged by spring means, for instance lever 42*b* by a tension spring 43*b*, against a common rail 41 which is mounted so that it can be displaced parallel to itself in the direction "z" when entrained by a projection 40 on the link 19. The sensing levers therefore move or they are released for sensing in synchronism with the motions of the stop arm 2. The entraining elements 45*c*, 45*d* etc., are hingeably deflectable on hinges 45*c'* and 45*d'* etc., on the oscillator 3 or on a member entrained by the oscillator during its vertical movement. The selective control of the punches by the entraining elements 45*c*, 45*d* etc., may be effected by conventional means and in a manner analogous to that already described with reference to the coupling elements 20 and 21.

What is claimed is:

1. A perforated tape feed mechanism comprising:
a tape feed shuttle arm having a plurality of teeth engageable with perforations in said tape,
a tape stop arm having a plurality of teeth engageable with perforations in said tape to stop feed movement thereof,
shuttle arm mounting means allowing reciprocating motion of the shuttle arm along a first axis aligned with the direction of tape feed,
a mechanical oscillator providing simultaneous harmonic reciprocating motion along the first axis and a second axis orthogonal to the first axis,
first means for coupling the reciprocating movement of the oscillator along the first axis to the shuttle arm,
second means for coupling the reciprocating movement of the oscillator along the second axis to the shuttle and stop arms, said second coupling means including linkage means causing the teeth of the shuttle arm to engage the perforations in the tape while disengaging therefrom the teeth of the stop arm on a reciprocating stroke of the oscillator along said second axis thereby allowing reciprocating movement of the shuttle arm along said first axis to feed said tape and subsequently on a return reciprocating stroke of the oscillator along said second axis to disengage from said perforations the teeth of the shuttle arm and engage the teeth of said stop arm to prevent further feed movement of said tape, and means enabling said first and second coupling means to be selectively engaged and disengaged from said oscillator while said oscillator is running.

2. A mechanism according to claim 1 wherein said linkage means comprises linkage members selectively operable to cause the teeth of said shuttle member either to feed said tape in one direction along said first axis or feed said tape in a direction opposite to said one direction.

3. A mechanism according to claim 1 wherein said linkage means includes separate linkage members for selectively coupling the reciprocating movement of the oscillator along the second axis to the shuttle arm, said linkage members being alternately movable into a position to cause the shuttle arm to feed the tape in one direction along said first axis or in a direction opposite to said one direction.

4. A mechanism according to claim 3, in which said second coupling means includes a rocker arm, and means pivotally mounting the rocker arm between the shuttle and stop arms, and in which the linkage members are coupled to said rocker arm, one at each side of said pivotally mounting means, said rocker arm being rocked about said pivotal mounting means by reciprocating motion of the oscillator along said second axis when one or other of the linkage members couples said rocker arm to said oscillator causing said shuttle arm to move towards and away from said tape.

5. A mechanism according to claim 4, including an abutment face, a rocker lever, and a biasing spring urging one end of said rocker lever into engagement with said abutment face, and the other end of the rocker lever into engagement with one end of said rocker arm when said shuttle arm is disengaged from said tape and the teeth of said stop arm are engaged with the perforations in said tape.

6. A mechanism according to claim 3 including selectively operable punch members mounted for punching holes in said tape and wherein said linkage means further includes selectively operable punch linkage members to couple the reciprocating movement of the oscillator along said second axis to said punch members to punch holes in said tape.

7. A mechanism according to claim 3 including means for sensing holes in said tape comprising sensing levers and means for releasing the sensing levers in synchronism with the movement of said stop arm.

8. A mechanism according to claim 1 in which said shuttle arm mounting means is adapted to urge the shuttle arm towards said tape and the mechanism further includes means mounting the stop arm below the tape.

9. A mechanism according to claim 8 including a first spring urging said shuttle arm towards said tape, a second spring urging said stop arm towards said tape, and a forked member between whose arms the shuttle member is positioned for reciprocating movement along said first axis, said first spring being positioned to bear against said forked member.

10. A mechanism according to claim 8 in which said shuttle arm mounting means comprises hinge means coupled to said shuttle arm allowing reciprocating movement thereof along said second axis, oppositely disposed spring members clamping therebetween said hinge means thereby allowing said shuttle arm to reciprocate along said first axis.

11. A mechanism according to claim 10 in which said hinge means comprises a leaf spring and said second coupling means further includes a strap connecting said leaf spring to said linkage means.

12. A mechanism according to claim 11 including a biasing spring urging said shuttle arm towards said tape.

13. A mechanism according to claim 12 including a stop member located to allow the teeth of the shuttle and stop arms both to just engage the perforations in the tape before the teeth of one arm fully engages the tape as the teeth of the other arm become disengaged from the tape.

14. A mechanism according to claim 1 in which said first and second coupling means are so contrived that the phase of the component of motion which controls the feed motion of said shuttle arm and said stop arm can be selectably shifted by half a phase.

15. A perforated tape feed mechanism comprising:
a tape feed shuttle arm having a plurality of teeth engageable with perforations in said tape,
a tape stop arm having a plurality of teeth engageable with perforations in said tape to stop feed movement thereof,
shuttle arm mounting means allowing reciprocating motion of the shuttle arm along a first axis aligned with the direction of tape feed,
a mechanical oscillator providing simultaneous harmonic reciprocating motion along said first axis and a second axis orthogonal to said first axis, said oscillator comprising an oscillator member, a shaft, means eccentrically mounting said oscillator member on said shaft and tension strap means coupled to said oscillator member to allow it to be reciprocated simultaneously along said first and second orthogonal axes upon rotation of said shaft, first means coupling the reciprocating movement of said oscillator member along said first axis to the shuttle arm, and second means coupling the reciprocating movement of said oscillator member along said second axis to said shuttle and stop arms, said second coupling means including linkage means causing the teeth of said shuttle arm to engage the perforations in the tape while disengaging therefrom the teeth of said stop arm on a reciprocating stroke of said oscillator member along said second axis thereby allowing reciprocating movement of said shuttle arm along said first axis to feed the tape and subsequently on a return reciprocating stroke of said oscillator member along said second axis to disengage from said perforations the teeth of said shuttle arm and engage the teeth of said stop arm to prevent further feed movement of the tape.

16. A mechanism according to claim 15 wherein said first coupling means includes an extension arm coupled to said shuttle arm and to said oscillator member of said oscillator.

17. A perforated tape feed mechanism comprising:

a tape feed shuttle arm having a plurality of teeth engageable with perforations in said tape, a tape stop arm having a plurality of teeth engageable with perforations in said tape to stop feed movement thereof, a mechanical oscillator providing simultaneous harmonic reciprocating motion along the first axis and a second axis orthogonal to the first axis, said oscillator comprising a rotatable shaft, a member eccentrically journalled on said shaft and an oscillator arm extending from said member, shuttle arm mounting means allowing reciprocating motion of the shuttle arm along a first axis aligned with the direction of tape feed and which comprises a fixed support, a clamping plate and two leaf springs between which said clamping plate is mounted, the ends of said springs opposite to those ends between which said clamping plate is mounted being secured to said fixed support so that reciprocation along said first axis of said oscillator arm which is coupled to said clamping plate causes said shuttle arm mounting means and said shuttle arm to reciprocate along said first axis, and means coupling the reciprocating movement of said oscillator arm along said second axis to said shuttle and stop arms, said coupling means including linkage means causing the teeth of said shuttle arm to engage the perforations in the tape while disengaging therefrom the teeth of said stop arm on a reciprocating stroke of the oscillator arm along said second axis thereby allowing reciprocating movement of said shuttle arm along said first axis to feed the tape and subsequently on a return reciprocating stroke of said oscillator arm along said second axis to disengage from said perforations the teeth of said shuttle arm and engage the teeth of said stop arm to prevent further feed movement of the tape.

18. A mechanism according to claim 17 in which said shuttle arm comprises a plate-like member having at one end thereof said teeth for engaging perforations in said tape and a leaf spring securing to said clamping plate that end of said plate-like member opposite to said one end.

19. A mechanism according to claim 18 in which said second coupling means includes actuating members carried by said eccentrically journalled member, a rocker arm, means pivotally mounting said rocker arm between the shuttle and stop arms, levers depending from said rocker arm one each side of said pivotally mounting means and engageable with said actuating members and means operating said actuating members to cause either one of said depending levers to be coupled to said eccentrically journalled member so that reciprocation thereof along said second axis causes the rocker member to allow the teeth of the shuttle arm to engage the perforations in said tape and disengage the teeth of said stop arm from said perforations.

20. A mechanism according to claim 19 including means urging said shuttle and stop arms towards said tape and a stop member mounted between the shuttle and stop arms to allow the teeth of the shuttle and stop arms both to just engage the perforations in said tape before the teeth of one arm fully engages the perforations as the teeth of the other arm become disengaged from the tape.

* * * * *